United States Patent [19]
Moon et al.

[11] Patent Number: 5,708,675
[45] Date of Patent: Jan. 13, 1998

[54] LASER APPARATUS

[75] Inventors: William L. Moon, Apopka; Ronald Selleck, Winter Park; Larry G. Jones, Apopka; Robert K. Bratton, Casselberry, all of Fla.

[73] Assignee: Litton Systems, Inc., Woodland Hills, Calif.

[21] Appl. No.: 707,626

[22] Filed: Sep. 5, 1996

Related U.S. Application Data

[63] Continuation of Ser. No. 385,634, Feb. 8, 1995.

[51] Int. Cl.$^6$ .................................................. H01S 3/08
[52] U.S. Cl. .................... 372/92; 372/99; 372/70; 372/66; 372/95; 372/93; 372/103
[58] Field of Search .................... 372/23, 61, 95, 372/9, 70, 92, 93, 66, 99, 103, 108; 427/164

[56] References Cited

U.S. PATENT DOCUMENTS

| | | | |
|---|---|---|---|
| 3,222,615 | 12/1965 | Holly | 372/66 |
| 3,891,945 | 6/1975 | Schlossberg et al. | 372/66 |
| 4,327,129 | 4/1982 | Sepp | 427/164 |
| 4,567,597 | 1/1986 | Mandella | 372/66 |
| 4,751,716 | 6/1988 | Ream et al. | 372/66 |
| 4,845,721 | 7/1989 | Hoffmann | 372/66 |
| 4,903,271 | 2/1990 | Yasui et al. | 372/103 |
| 5,029,173 | 7/1991 | Seguin | 372/23 |
| 5,058,123 | 10/1991 | Yasui et al. | 372/103 |
| 5,210,768 | 5/1993 | Seguin | 372/93 |
| 5,373,535 | 12/1994 | Nowack et al. | 372/99 |

*Primary Examiner*—Leon Scott, Jr.
*Attorney, Agent, or Firm*—William M. Hobby, III

[57] ABSTRACT

A laser apparatus includes a hollow cylindrical solid state laser medium and an optical resonator having reflective surfaces at each end of the laser medium in the axial direction of the laser medium for causing a light emitted into the laser medium to travel back and forth along the elongated axial direction of the laser medium. One of the reflective surfaces of the optical resonator is shaped to reflect the beam at an angle to the beam impinging thereagainst to thereby walk the beam tangentially around the hollow cylindrical solid state laser medium at a fixed radial distance from the elongated axis of the laser medium. An exit slot is formed in one of the reflective surfaces. A pumping means for exciting the laser medium includes at least one flashlamp positioned adjacent the laser medium along the laser medium axis through the hollow cylindrical portion of the laser.

9 Claims, 1 Drawing Sheet

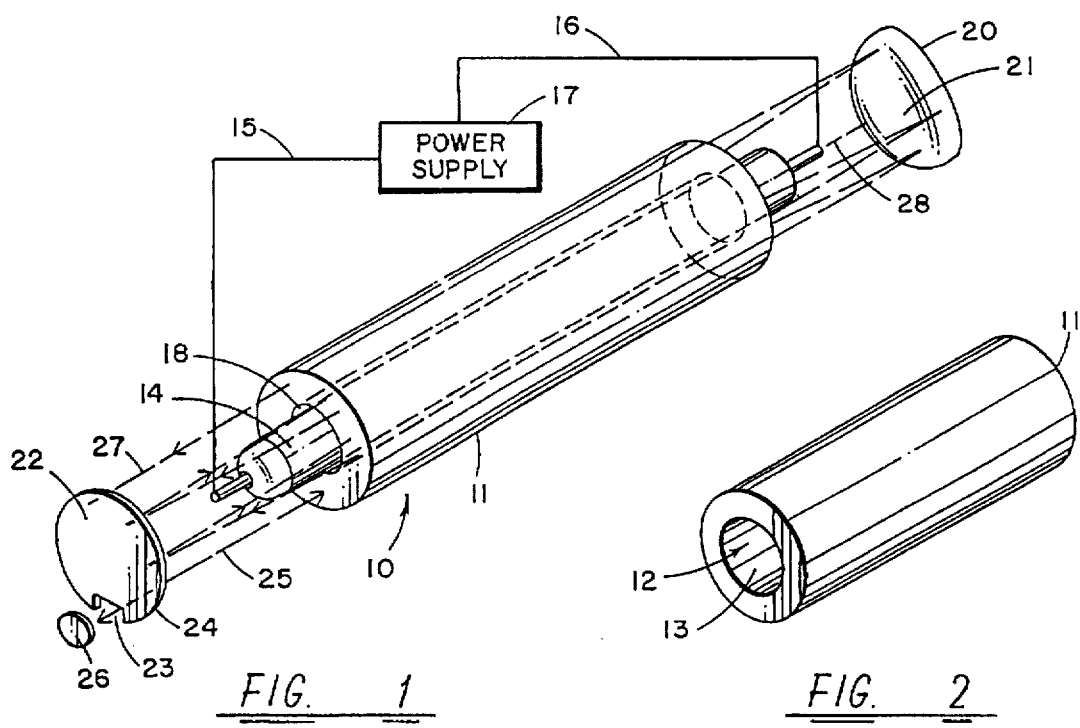
FIG. 1
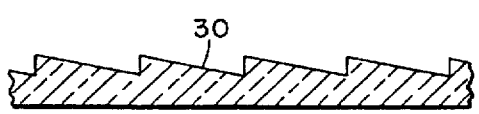
FIG. 2
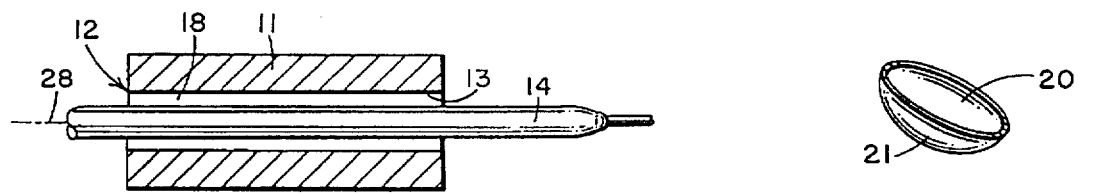
FIG. 3
FIG. 4
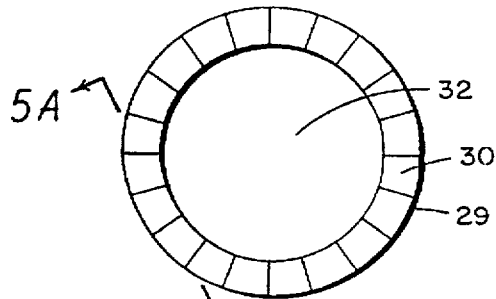
FIG. 5
FIG. 5A
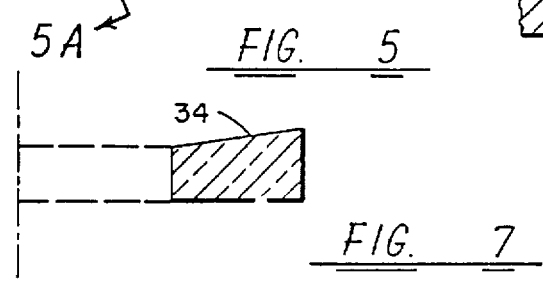
FIG. 6
FIG. 7

LASER APPARATUS

This is a continuation of application Ser. No. 08/385,634 filed Feb. 8, 1995.

BACKGROUND OF THE INVENTION

This invention relates to a laser apparatus and especially to a hollow cylindrical solid state laser having a beam walk around the laser medium.

In the past, solid state laser mediums have been commonly used including rod-like solid state laser mediums and slab-like solid state laser mediums. The solid state laser rod emits a laser beam when irradiated by flashlamps surrounding the medium and when the diameter of the rod becomes large enough, heat generated during irradiation is accumulated in the interior of the rod with the consequent drawback that the index of refraction becomes nonuniform within the medium and the rod itself suffers from mechanical stresses. In addition, when the diameter of the rod becomes too large, it leads to a problem that the excitation fails to reach the central portion of the rod with sufficient strength.

In a slab laser medium, both the top and bottom surfaces of the slab are excited, such as with flashlamps and at the same time the laser beam that is excited is input and output through the end surfaces of the slab that are typically cut with a brewster angle. In this laser medium, the excited laser beam is reflected between the top and bottom surfaces and propagates the whole length of the laser medium so that the laser beam is free from lens effect and there is a high efficiency of energy takeout from the laser medium. However, the laser beam propagates through the medium by undergoing total reflection between the top and the bottom surfaces of the medium and, in order to maintain a satisfactory condition of oscillation, both surfaces have to be polished accurately which leads to problems in tie fabrication of the slab laser medium.

The present invention is directed towards a solid state rod laser medium having a hollow cylindrical solid state laser medium having an optical resonator which walks the beam in slight steps through the elongated annular medium by reflecting the beam at one or both ends at a slight angle to the impinging beam so that the beam walks its way around the annular laser rod for a predetermined number of passes through the laser medium before a portion of the energy in the beam is outputted from the laser. Pumping means can be by virtue of a flashlamp placed in the center of the hollow cylindrical rod and may be spaced from the inner surface of the rod to allow for cooling during the operation of the laser. The laser rod can also have a transmission filter on the inside to transmit energy at predetermined pumping wavelengths. Alternately, the laser rod can also have a reflective filter on the inside to reflect energy at predetermined non-pumping wavelengths. One prior art patent may be seen in the Ream et al. patent for a Hollow Cylindrical Solid State Laser Medium and a Laser System using the Medium which uses a solid state laser rod formed cylindrically in order to improve the cooling efficiency of the laser and pumps the laser rod with a plurality of flashlamps arranged on the outside, of the hollow solid state laser rod. In another prior U.S. Pat. No. 3,634,779 to Crow, and owned by Applicant, a High-Inversion Laser Device has an impregnated flash tube jacket along with an ultraviolet absorbing filter between the laser rod and the flash tube and a filter within the laser rod.

SUMMARY OF THE INVENTION

A laser apparatus has a hollow cylindrical solid state laser medium or rod and an optical resonator having reflective surfaces at each end of the laser medium in the axial direction of the laser medium for causing a light emitted into the laser medium to travel back and forth along the elongated axial direction of the laser medium. At least one of the reflective surfaces of the optical resonator is shaped to reflect the beam at an angle to the beam impinging thereagainst to thereby walk the beam tangentially around the hollow cylindrical solid state laser medium at a fixed radial distance from the elongated axis of the laser medium. An exit slot or partially reflective mirror is formed in one of the reflective surfaces. A pumping means for exciting the laser medium includes at least one flashlamp positioned adjacent the laser medium along the laser medium axis through the hollow cylindrical portion of the laser.

BRIEF DESCRIPTION OF THE DRAWINGS

Other objects, features, and advantages of the present invention will be apparent from the written description and the drawings in which:

FIG. 1 is a perspective and diagrammatic view of a tube laser in accordance with the present invention;

FIG. 2 is a perspective view of a hollow cylindrical solid state laser rod in accordance with the present invention;

FIG. 3 is a sectional view taken through the laser rod in accordance with FIG. 1;

FIG. 4 is a perspective-view of the resonator reflective surface;

FIG. 5 is an elevation of an alternate embodiment of an optical resonator reflector surface for walking a beam in the laser of FIG. 1;

FIG. 5A is a sectional view taken on line A—A of FIG. 5;

FIG. 6 is a sectional view similar to FIG. 5A of an alternate embodiment of the optical resonator reflective surface taken on the same line as FIG. 5A; and FIG. 7 is a sectional view taken radially through an alternate embodiment of an optical resonator reflective surface.

DESCRIPTION OF THE PREFERRED EMBODIMENTS

Referring to the drawings and especially to FIGS. 1-3, a tube laser system 10 is illustrated having a cylindrical solid state laser medium 11 which can be a hollow cylinder of any medium desired, such as a YAG crystal, cast as a glass or drilled from a solid cylinder and which has been doped with neodymium. The rod 11 is more clearly shown in connection with FIG. 2 and forms an annular cross-section with a bore 12 passing through the center of the laser rod 11. The surface of the hollow interior of the rod 11 may be coated with a filter material, as desired, especially where the flashlamp 14 is to be mounted through the bore 12, as shown in FIG. 1. The flashlamp can be a standard arc flashlamp which is connected with conductors 15 at one end and 16 at the other end to supply power to the flashlamp 14 from the power supply 17. Power supply 17 powers the flashlamp 14 inside the laser rod 11, shown mounted in the laser rod 11 with an annular spacing 18 therearound which can be utilized for cooling a space between the flashlamp 14 and the inside of the laser rod 11. An optical resonator is formed with a 100% reflective surface 20 at one end which mirrored surface 20 has a slightly spherical surface 21 on the side facing the laser rod 11. A 100% reflective surface 22 can be mounted at the opposite end to position the laser rod 11 between the two reflective surfaces. The reflective surface 11 has a cutout slot or output opening 23 positioned along the periphery 24 of the reflective surface 22 so that a beam which enters or exits past the slot 23, indicated with an arrow 25, passes through a lens 26 or partial mirror.

As can be seen from FIG. 1, beam 27 is shown being walked around the laser rod 11 in a series of steps but it should, of course, be clear that a much larger number of steps would be anticipated producing continuous passes through different portions of the laser rod 11. The optical path is stepped tangentially around the tube at a fixed radial distance from the tube axis 28. Stepping is accomplished by the shape of the reflectors 20 and 22. In the case of FIG. 1, the surface of the reflectors has a very slight spherical curvature on one side so that the beam hitting the edge of the slightly convex surface along its edge is deflected at a slight angle to thereby walk the beam around the rod 11. Each surface of each reflector 20 and 22 may have a spherical one sided surface.

FIG. 4 illustrates the reflector 20 having the curvature 21 exaggerated.

Turning to FIGS. 5 and 5A, an alternative embodiment of an end reflector 20 is illustrated having a plurality of slightly angled steps 30 (as seen in FIG. 5A) spaced around the periphery of the lens 29 which lens can have a smooth center portion 32, or alternatively, a hollow center portion. A number of angled steps 30 can be placed annually around the lens to provide a continuous stepping at any angle desired by the angle of each step 30 so that the beam can make as many passes as desired through the solid state rod 11.

In FIG. 6, an alternative embodiment of end reflector 20 taken on the same line as FIG. 5A and having a plurality of many roof prism steps having angle steps 33 spaced around the periphery of the lens which may also have a hollow center portion.

In FIG. 7, an alternative embodiment of end reflector 20 has angle 34 shown in a sectional view radially through the lens, taken on towards the axis where redirection of the incident beam is accomplished via angled multiple reflections.

It should be clear at this point, that a laser incorporating a resonator with a tube-shaped laser medium has been provided and in which the front and back mirrors of the resonator are designed to step the optical path tangentially around the tube at a fixed radial distance from the tube axis. It should also be clear that this design allows for the utilization of greater laser gain volume and a much greater length of single pass optical path which is more efficient than existing designs. The present tube laser is thereby more efficient, utilizes fewer flashlamps for a similar output power while providing better cooling of the laser medium and less stress on the solid state laser rod with a longer optical path with better beam quality. However, the present invention should not be considered limited to the features shown which are to be considered illustrative rather than restrictive.

I claim:

1. A laser comprising:

an optical resonator having a hollow cylindrical solid state laser medium having a center axis and having a reflective surface on each end thereof for reflecting a light beam therebetween through said laser medium, one of said reflective surfaces having a light opening therein aligned with one end of said laser medium for the passage of a light beam therethrough and the other said reflective surface being shaped to reflect a light beam therefrom at an angle to the light beam impinging thereagainst and tangentially to the laser medium at a generally fixed distance from the laser medium center axis so that a light beam will in successive passes through said laser medium between said reflective surfaces walk a light beam tangentially around said hollow cylindrical solid state laser medium at a generally fixed radial distance from said laser medium center axis until it exits through the light opening in said one reflective coating; and pumping means for exciting said laser medium, said pumping means including at least one flashlamp positioned inside said hollow cylindrical laser medium, whereby said laser has a longer optical path with improved gain and efficiency.

2. A laser in accordance with claim 1 in which said other reflective surface is a generally semi-spherical reflective surface.

3. A laser in accordance with claim 1 in which said other reflective surface has a plurality of stepped angled surfaces forming an annular reflective ring of stepped reflectors.

4. A laser in accordance with claim 1 in which said other reflective surface includes a plurality of roof prism reflectors forming an annular reflective ring of stepped reflectors.

5. A laser in accordance with claim 1 in which said one said reflective surface has a generally square slot light opening.

6. A laser in accordance with claim 1 having a lens adjacent said one reflective surface in line with said light opening.

7. A laser in accordance with claim 1 in which said pumping means includes an arc lamp positioned inside the hollow cylindrical solid state laser medium along the center axis thereof.

8. A laser in accordance with claim 1 in which said hollow cylindrical solid state laser medium has a filter coating on the interior hollow wall between said flashlamp and said laser medium.

9. A laser in accordance with claim 1 in which said hollow cylindrical solid state laser medium has a reflective surface around said laser medium.

* * * * *